(12) United States Patent
Cook

(10) Patent No.: US 10,425,277 B2
(45) Date of Patent: Sep. 24, 2019

(54) DIAGNOSTIC INFORMATION LOGGING

(75) Inventor: Gregory William Cook, San Jose, CA (US)

(73) Assignee: Thomson Licensing, Cesson-Sévigné (FR)

( * ) Notice: Subject to any disclaimer, the term of this patent is extended or adjusted under 35 U.S.C. 154(b) by 203 days.

(21) Appl. No.: 13/982,306

(22) PCT Filed: Jan. 9, 2012

(86) PCT No.: PCT/US2012/020577
§ 371 (c)(1),
(2), (4) Date: Jul. 29, 2013

(87) PCT Pub. No.: WO2012/106066
PCT Pub. Date: Aug. 9, 2012

(65) Prior Publication Data
US 2013/0311625 A1    Nov. 21, 2013

Related U.S. Application Data

(60) Provisional application No. 61/437,924, filed on Jan. 31, 2011.

(51) Int. Cl.
| | | |
|---|---|---|
| *H04L 12/24* | (2006.01) | |
| *G06F 11/07* | (2006.01) | |
| *G06F 11/34* | (2006.01) | |

(52) U.S. Cl.
CPC ...... *H04L 41/0813* (2013.01); *G06F 11/0781* (2013.01); *G06F 11/3476* (2013.01); *H04L 41/069* (2013.01); *H04L 41/0681* (2013.01)

(58) Field of Classification Search
CPC ............... H04L 41/069; H04L 41/0681; H04L 41/0813; G06F 11/3476; G06F 11/0781
USPC ......................................................... 709/221
See application file for complete search history.

(56) References Cited

U.S. PATENT DOCUMENTS

| | | | | |
|---|---|---|---|---|
| 5,446,523 A | * | 8/1995 | Shimomura | ........... G03G 15/55 |
| | | | | 399/42 |
| 5,504,921 A | * | 4/1996 | Dev | ..................... G06F 11/2257 |
| | | | | 707/999.01 |
| 6,202,090 B1 | | 3/2001 | Simone | |
| 6,205,239 B1 | * | 3/2001 | Lin | .................. G01N 21/95607 |
| | | | | 257/E21.525 |
| 6,879,995 B1 | * | 4/2005 | Chinta | .................... H04L 67/24 |
| | | | | 709/204 |

(Continued)

FOREIGN PATENT DOCUMENTS

JP    2010141655    6/2010

OTHER PUBLICATIONS

ISR.

*Primary Examiner* — Gil H. Lee
*Assistant Examiner* — Javier O Guzman
(74) *Attorney, Agent, or Firm* — Myers Wolin LLC

(57) ABSTRACT

Methods, systems and apparatuses for logging diagnostic information are disclosed. In accordance with one method, first diagnostic information is logged in a router in accordance with a first mode having a first logging rate. In addition, an operational problem within the router is detected. Further, in response to detecting the operational problem, second diagnostic information is logged in accordance with a second mode having a second logging rate that is greater than the first logging rate of the first mode.

5 Claims, 5 Drawing Sheets

(56) References Cited

U.S. PATENT DOCUMENTS

| | | | |
|---|---|---|---|
| 2002/0198983 A1* | 12/2002 | Ullmann | G06F 11/0709 709/224 |
| 2004/0049572 A1* | 3/2004 | Yamamoto | G06F 17/30067 709/224 |
| 2005/0210077 A1 | 9/2005 | Balakrishnan et al. | |
| 2007/0008968 A1* | 1/2007 | Baker | H04L 41/06 370/390 |
| 2007/0067675 A1* | 3/2007 | Wigley et al. | 714/20 |
| 2009/0210283 A1* | 8/2009 | Miyamoto | G06F 11/0748 705/7.14 |
| 2011/0125615 A1* | 5/2011 | Shirbabadi | G06Q 10/00 705/28 |
| 2011/0149720 A1* | 6/2011 | Phuah | H04L 41/0681 370/216 |
| 2012/0131185 A1* | 5/2012 | Petersen et al. | 709/224 |
| 2012/0239973 A1* | 9/2012 | Walton | G06F 11/0712 714/15 |
| 2013/0282865 A1* | 10/2013 | Baptist | H04L 67/16 709/217 |

* cited by examiner

DIAGNOSTIC INFORMATION LOGGING

This application claims the benefit, under 35 U.S.C. § 365 of International Application PCT/US2012/020577, filed Jan. 9, 2012 which was published in accordance with PCT Article 21(2) on Aug. 9, 2012 in English and which claims the benefit of U.S. provisional patent application No. 61/437,924, filed Jan. 31, 2011.

TECHNICAL FIELD

The present invention generally relates to logging diagnostic information, and, more particularly, to logging systems, methods and devices for routers and similar computing devices.

BACKGROUND

Routers have implemented a variety of logging methods to enable compiling and retention of diagnostic information. For example, a physically separate non-volatile RAM (random access memory) that is separate from the main flash memory has been maintained in such routers for logging. The separate memory is used in this case to avoid wearing out the main non-volatile RAM. Other methods simply assume that the flash memory will not wear out in the lifetime of the product. However, an excessive amount of logging, as can be induced by a problem in the router, can render the lifetime estimate inaccurate and can prematurely cause failure of the memory of an electronic device.

SUMMARY

One embodiment is directed to a method. In accordance with the method first diagnostic information is logged in a router in accordance with a first mode having a first logging rate. In addition, an operational problem within the router is detected. Further, in response to detecting the operational problem, second diagnostic information is logged in accordance with a second mode having a second logging rate that is greater than the first logging rate of the first mode.

An alternative embodiment is directed to an apparatus that includes a communication interface and a controller. The controller configured to log first diagnostic information in a router in accordance with a first mode and to detect an operational problem within the router. In addition, the communication interface is configured to transmit an indication of the operational problem and to remotely receive instructions to log second diagnostic information in the router in accordance with a second mode. The controller is further configured to log the second diagnostic information in accordance with the second mode in response to receipt of the instructions. Here, the second diagnostic information is composed of a larger amount of data than the first diagnostic information.

Another embodiment is directed to a system that includes a communication interface and a controller. The communication interface is configured to remotely receive an indication of an operational problem at a router. Further, the controller is configured to direct the communication interface to transmit instructions to the router that direct the router to switch a logging mode from a first mode to a second mode. First diagnostic information is logged at the router in accordance with the first mode and second diagnostic information is logged at the router in accordance with the second mode. The second diagnostic information is composed of a larger amount of data than the first diagnostic information.

BRIEF DESCRIPTION OF THE DRAWINGS

The teachings of the present invention can be readily understood by considering the following detailed description in conjunction with the accompanying drawings, in which.

Figure 1:
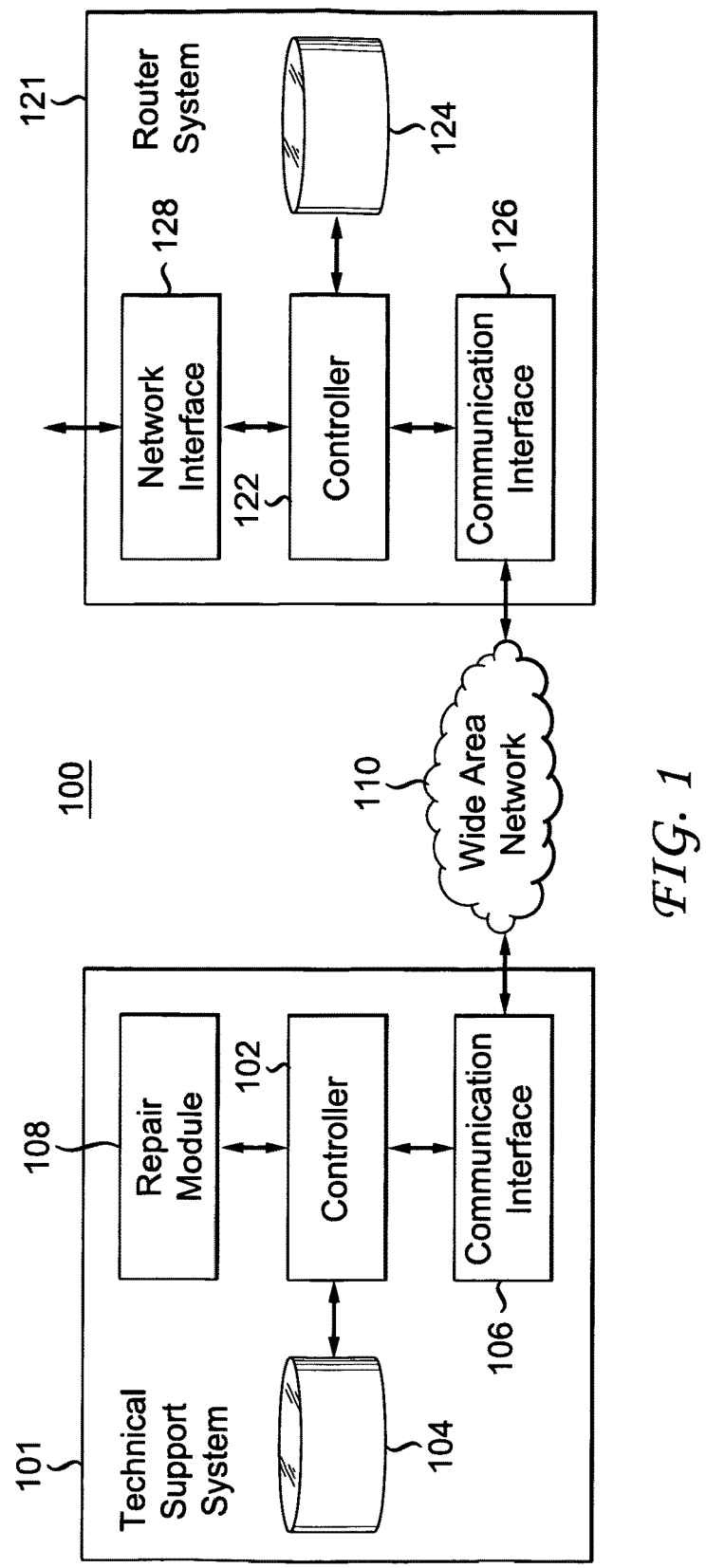
FIG. 1 is a high-level block/flow diagram of an exemplary embodiment of a logging system in accordance with the present principles.

It should be understood that the drawings are for purposes of illustrating the concepts of the present principles and are not necessarily the only possible configuration for illustrating the present principles. To facilitate understanding, identical reference numerals have been used, where possible, to designate identical elements that are common to the figures.

DETAILED DESCRIPTION

The present principles are directed to methods, systems and apparatuses for logging diagnostic information. In accordance with exemplary aspects of the present principles, multiple logging modes can be employed to log diagnostic information in a way that minimally affects the service life of the memory used to store the logs and that maintains effectiveness of the logs in enabling repairs of the system. In particular, the logging can be switched to a more comprehensive mode in response to detecting certain problems in the system, such as freezing and unexpected rebooting. According to one feature, the logging mode can be altered so that more relevant or different information is logged. Alternatively or additionally, the logging mode can be altered such that the logging rate is increased and/or the maximum number of writes is changed in response to detecting a problem. Advantageously, the logging mode alteration can be directed remotely at a vendor technical support site in response to receiving an indication that a problem has been detected by the system or by a user of the system. This feature enables the vendor to retain proprietary control of system settings and thereby ensure that the life of the system is not prematurely shortened by the user. For example, the remote settings of the logging modes can be monitored and can be compared to system models to ensure that the system has at least a minimum service life in accordance with system specifications provided by the vendor to users.

It should be understood that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware and also computer readable storage mediums for storing software, such as read-only memory ("ROM"), random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

As indicated above, the logging of events is very important for certain equipment, such as a broadband home router (BHR) and the like, because the logging records the past and present state of the device and aids in troubleshooting any problems that a consumer might have with the device. Logging is utilized to record events to enable the determination of sources of failure as well as proper operation and to identify hacking threats. If the information is logged in only volatile memory and the device reboots because of an operational problem, then the logging information can be lost at a time when it is most crucial to record. As a result, the main flash memory has been used to store such information.

Logging, while straightforward for a standard computer, is difficult in the context of a contemporary consumer electronics design, such as in a BHR. The main difficulty is the estimation of the projected number of writes to the flash memory, which is finite and is currently thought to be no more than 100,000, possibly as low as 10,000. In the past, this condition was usually solved by adding additional Electrically Erasable Programmable Read-Only Memory (EEPROM) technology, where 10,000,000 writes capability is the norm. However, due to cost constraints, only non-volatile memory of the flash itself is used for logging purposes. An analysis was performed on the number of writes used for a typical logging system, and it was found that it is possible to encounter some cases where the flash fails before the electronic device itself becomes obsolete. Consequently, writing all of the logging information to non-volatile RAM can prematurely end the life of the product. As such, rather than fulfilling a full logging functionality completely, a conditional non-volatile logging system/method can be used.

As stated above, the purpose of a logging system is to enable the performance of a forensic analysis of a problem and to enable the use of this information to correct it. Of course, as indicated above, if a problem causes a reboot and the logs are stored in volatile memory, then the logs can be lost. On the other hand, the number of times in normal operation that a freeze/reboot occurs can be a relatively small number, and much of the logging (and attendant writing to the flash memory) would be wasted. Thus, by implementing a scheme whereby logs can be written to non-volatile RAM only if the situation warrants it—e.g., an issue which causes a reboot—the device can maintain the ability to assist in diagnosing issues, while still maintaining a long life.

As described herein below, a new logging scheme, which is referred to herein as "persistent logging," can be utilized based on a set of conditions that exist in an electronic device, such as a BHR, itself. In accordance with an aspect of the present principles, logging information is stored in an electronic device's non-volatile memory only for repair/debugging purposes, thereby greatly reducing the number of writes to the memory. The logging system is particularly efficient when electronic memory is used.

In accordance with one exemplary aspect, under normal conditions, the electronic device (e.g., BHR) records a minimal amount of information, and limits itself to no more than one write every N1 minutes. The actual times can be decided based on operational factors. This is designated as a "Level 1" condition; the minimum information in this case corresponds to relevant information gathered since the most recent reboot time. Such information can be related to connectivity issues in accordance with DHCP (dynamic host control protocol) or PPPoE (Point to Point Protocol over Ethernet), and is not be gathered very often.

In turn, a "Level 2" condition permits writes every N2 minutes, where N2 is less than N1, and can prompt the device to generate one or more of the following logs: firewall logs, LAN (local area network) DHCP transactions, interface settings logs, IGMP (Internet Gateway Management Protocol) logs, as well as other logs as appropriate or specified by an administrator.

Operational factors that can be considered to set "N1" and "N2" can include the number of writes available to the memory, the estimated number of writes per second and the operational life of the product. For the "N1" range, it is estimated that once per hour would be sufficient, while "N2" can be as high as once per second. However, the values can be varied based on the operational factors.

Level 1 and Level 2 Flags, as well as N1 and N2, in the device can be remotely settable, using, for example, TR-069 (CPE (Customer Premises Equipment) WAN (Wide Area Network) Management Protocol) vendor extensions. This feature enables a technical support representative to increase the persistent logging amount in the event a customer is having difficulty with the device as a result of freezing/ rebooting. In addition, maximum logging values, M1 and M2, can be set so that persistent logging does not overwhelm the flash space in the event that a debugging/repair process was inadvertently left running. For example, M1 can be set to 1 kilobyte per hour, while M2 can be set to a rate as high as 1 megabyte per hour.

In accordance with another exemplary aspect, logs stored in main memory can be consulted primarily in the event that a router has a problem, where freezing/rebooting is not an issue.

Referring now in specific detail to the drawings in which like reference numerals identify similar or identical elements throughout the several views, and initially to FIG. 1, a system/apparatus 100 of an embodiment of the present principles is illustratively depicted. It should be understood that the aspects of the present principles described above can be implemented in the system, apparatus and method embodiments described herein. The system 100 can include a technical support system 101 and a router system 121 that communicate through a wide area network 110, such as the internet, which can be wired or wireless or can include both wired and wireless components. It should be noted that although features of the present principles are described herein with respect to a router system 121, in accordance with alternative embodiments, the system 121 can be any other appropriate computing system. The router system 121 can include a controller 122, a communication interface 126, a network interface 128 and a storage medium 124. In turn, the technical support system 101 can include a controller 102, a communication interface 106, a repair module 108 and a storage medium 104. The functions of the various elements of the system 100 are described in more detail herein below with respect to specific apparatus and method embodiments.

Figure 2:
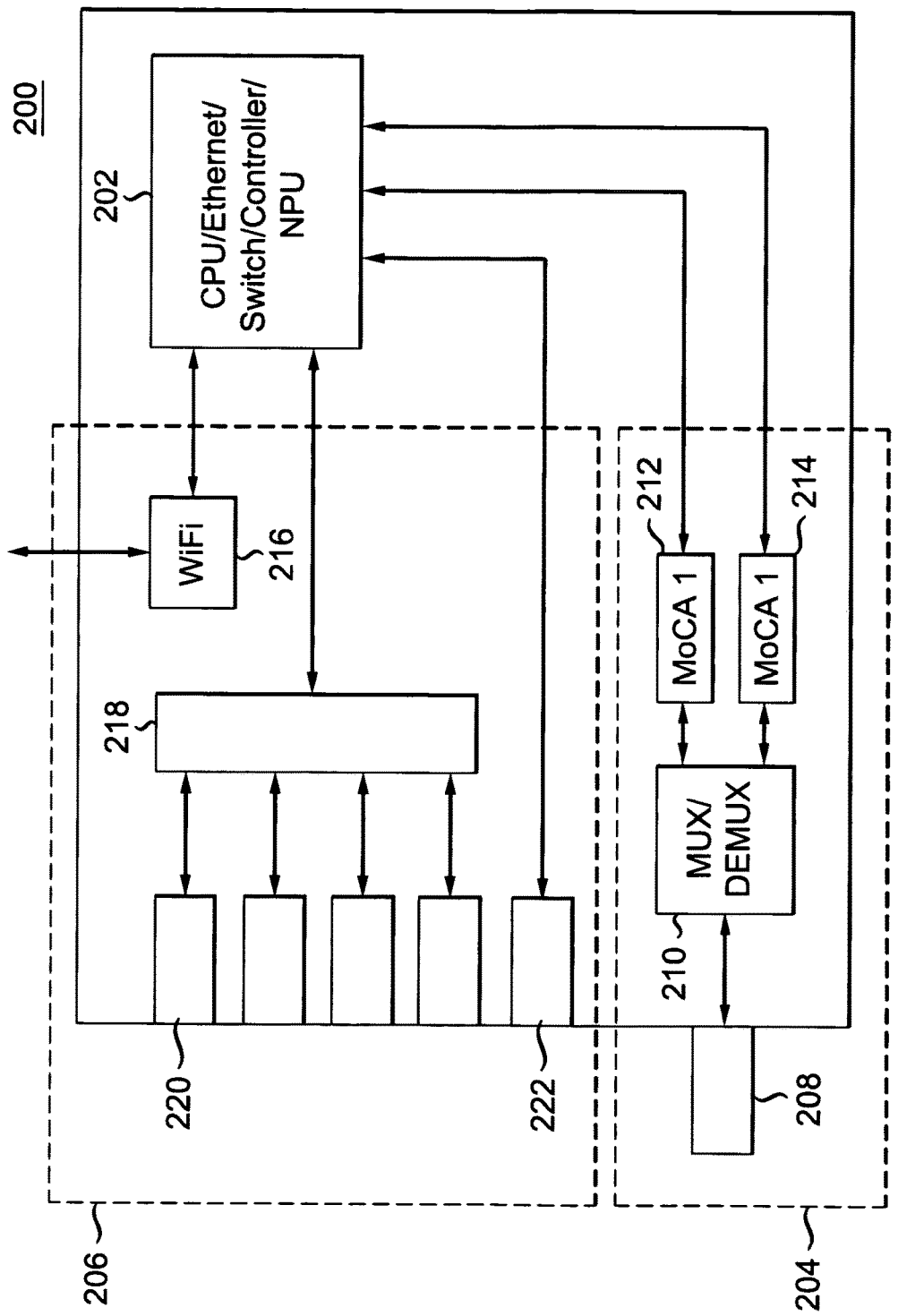
FIG. 2 is a high-level block/flow diagram of an exemplary embodiment of a broadband home router in accordance with the present principles.

Referring to FIG. 2 with continuing reference to FIG. 1, a more specific implementation 200 of the router system 121 is illustratively depicted. The system 200 is a broadband home router and can include a controller element 202, which can comprise a central processing unit (CPU), an Ethernet switch, a network processing unit (NPU) and a storage medium. Here, the controller element 202 is one exemplary implementation of the controller 122 and the storage medium 124. The system 200 can further include a communication interface 204 and a network interface 206, which are exemplary implementations of the communication interface 126 and the network interface 128, respectively. The communication interface 204 can include a coaxial port 208 through which a connection to the network 110 can be made. In addition, the communication interface 204 can include a multiplexer/demultiplexer 210 for both LAN frequencies and WAN frequencies and MoCA (Multimedia over Coax Alliance) switches 212 and 214 for LAN traffic (about 1125 MHz to about 1525 MHz (single channel)) and WAN traffic (about 975 MHz to about 1025 MHz, eight channels), respectively. Further, the network interface 206 can be employed to connect to a user's home network and can include a Wi-Fi interface 216, a system bus 218, RJ-45 LAN interfaces 220 and an RJ-45 WAN interface 222.

Figure 3:
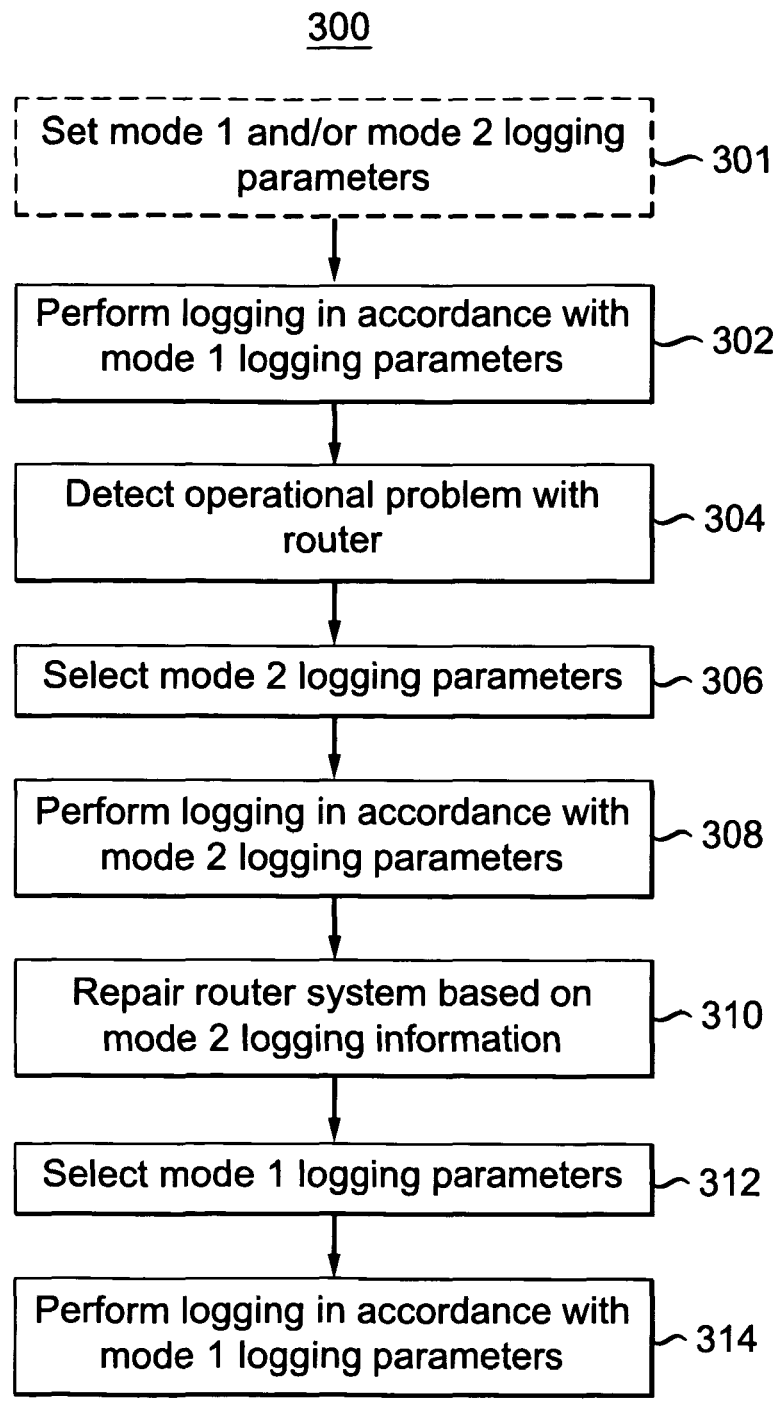
FIG. 3 is a high-level flow diagram of an exemplary embodiment of a logging method in accordance with the present principles.

With reference to FIG. 3, with continuing reference to FIG. 1, an exemplary embodiment of a logging method in accordance with the present principles is illustratively depicted. The method 300 can begin at optional step 301, at which logging parameters of one or more modes of the router system 121 can be set. For example, the router system can include a logging mode 1 that implements "level 1" logging described above and can further include a logging mode 2 that implements "level 2" logging described above. The respective logging parameters of each of the modes 1 and 2 can include respective logging rates, maximum numbers of writes and types of information logged. Here, the logging parameters can be set or altered by a user during initialization of the router system 201, can be pre-stored in the storage medium 124 by the vendor or manufacturer of the system 201 and/or can be remotely set or altered by the vendor or manufacturer of the system 201 through the network 110 from the system 101.

At step 302, the controller 122 of the system 221 can perform logging in accordance with mode 1 logging parameters. For example, as noted above, during normal operation, the controller 122 can log a minimal amount of diagnostic information related to connectivity, as specified by the mode 1 logging parameters, which can be stored in the storage medium 124 and referenced by the controller 122. Specific information that can be logged in accordance with the first mode can include: most recent reboot time, DHCP information and/or PPPoE information.

In addition, the controller 122 can also log the diagnostic information in accordance with a logging rate specified by the logging parameters of mode 1. For example, as indicated above, in the first mode of operation, the controller 122 can be configured to log or write diagnostic information in the storage medium 124 once every N1 minutes. Further, the controller 122 can also be limited by a maximum number of writes specified by the logging parameters of the first mode. For example, as indicated above, the logging parameters can specify a maximum logging value M1, which can denote a maximum number of writes that the controller 122 can make for purposes of logging in the first mode since the most recent boot-up.

At step 304, the controller 122 can detect an operational problem with the router system 121. For example, as indicated above, the controller 122 can detect a freeze or an unexpected reboot, which can have been initiated by the user in response to the freeze. Alternatively, the reboot can be performed by the router due to a programming bug. In accordance with one exemplary implementation, an operational problem can be detected by determining and assessing the time between reboots. If this time is low, for example, every hour, this clearly indicates a problem and the mode 2 logging would be initiated. Similarly, if a WAN connection is not maintained for more than an hour at a time, this would also indicate a problem and would trigger mode 2 logging.

At step 306, the controller 122 can select mode 2 logging parameters in response to detecting the operational problem at step 304. The selection can be implemented by setting a mode 2 flag, as indicated above. Similar to the mode 1 logging parameters, the mode 2 logging parameters can specify a logging rate and/or a maximum number of writes in accordance with which the controller 122 institutes the logging of diagnostic information. For example, as indicated above, the controller 122 can be configured to log or write diagnostic information in the storage medium 124 once every N2 minutes and/or can be limited by a maximum logging value M2, which can denote a maximum number of writes that the controller 122 can make for purposes of logging in the second mode since the most recent boot-up. Further, the logging rate and the maximum number of writes of mode 2 can be greater than the logging rate and the maximum number of writes of mode 1, respectively. As such, the controller 122, when operating under mode 2, can log diagnostic information that is composed of a greater amount of data than the diagnostic information logged according to mode 1. In addition, the mode 2 logging parameters can specify logging of diagnostic information that is in addition to and/or is different from diagnostic information logged according to mode 1. For example, as indicated above, the diagnostic information of mode 2 can include any one or more of the following: firewall logs, LAN DHCP transactions, interface settings logs and IGMP logs. Furthermore, the logging parameters of mode 1 can exclude specifications for logging any one or more of these types of information. Accordingly, the controller 122 can log diagnostic information in mode 2 that is more comprehensive than diagnostic information logged in mode 1 to better enable the controller 122 to determine a repair for the detected operational problem.

At step 308, the controller 122 can log diagnostic information in accordance with the mode 2 logging parameters described above with respect to step 306. For example, the controller 122 can log diagnostic information in accordance with a logging rate and/or a maximum number of writes as specified by the logging parameters of mode 2. In addition, the controller 122 can log diagnostic information in accordance with mode 2 that is different from and/or more comprehensive than the diagnostic information logged in accordance with mode 1.

At step 310, the controller 122 can repair the router system 121 and address the operational problem identified at step 304 based on the diagnostic information logged in accordance with mode 1 and/or diagnostic information logged in accordance with mode 2. For example, the controller 122 can employ standard debugging or troubleshooting tools to determine repair routines and apply the routines to the router system 121. In one exemplary implementation, the controller 122 can examine MoCA logs and determine if there were interfering systems on the coax connection which cause the MoCA to fail. Here, the controller 122 can direct such systems to shut down or can notify the user that such systems should be shut down. In another example, the controller 122 can determine that an Ethernet cable was incorrectly installed into the WAN port by examining the DCHP logs and can inform the user of the incorrect installation. In accordance with other exemplary aspects, a repair can include altering the logging parameters of mode 1 and/or mode 2 stored in the storage medium 124. For example, the repair can include altering any one or more of the logging rates (e.g., N1 and/or N2), the maximum number of writes (M1 and/or M2) and the types of information logged for mode 1 and/or mode 2. In addition, the controller 122 can tailor the logging parameters to obtain information specifically directed to diagnosing and repairing particular operational problems detected in the past, including the operational problem detected or identified at step 304. For example, suppose that the MoCA system is not working properly according to the mode 1 logs. The mode 2 logs could record many more parameters about how the MoCA system is operating. For example, the mode 2 logs can include MoCA performance metrics, such as the current signal-to-noise and the maximum bit rate between nodes. However, it should be noted that any logging rates and maximum number of writes for mode 2 should be larger than logging rates and maximum number of writes for mode 1.

At step 312, the controller 122 can select mode 1 logging parameters stored in the storage medium 124 in response to completing the repair. For example, the controller 122 can revert to the logging parameters employed at step 302 or can select any logging parameters of mode 1 altered at step 310. As indicated above, the selection can be implemented by setting a flag for mode 1.

At step 314, the controller 122 can perform logging in accordance with mode 1 logging parameters selected at step 312.

Figure 4:
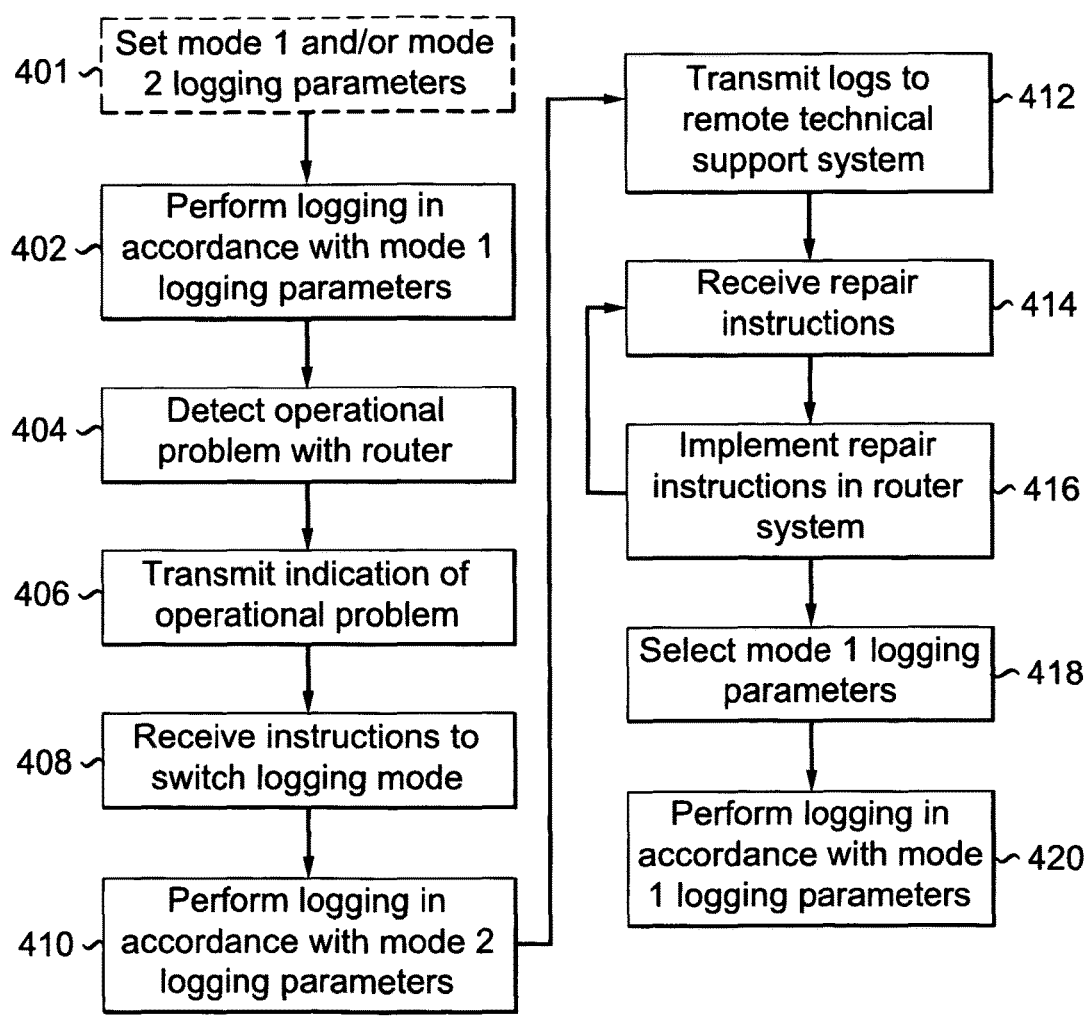
FIG. 4 is a high-level flow diagram of an exemplary embodiment of an alternative logging method in accordance with the present principles.

With reference now to FIG. 4, with continuing reference to FIGS. 1 and 3, an exemplary embodiment of an alternative logging method 400 in accordance with the present principles is illustratively depicted. It should be understood that the method 400 can be performed by the router system 121 and can be performed simultaneously with and can complement the method 500, described in more detail herein below. The method 400 can begin at optional step 401, at which logging parameters of one or more modes of the router system 121 can be set. For example, the router system can include the logging mode 1 described above and can further include the logging mode 2 described above. For example, the respective logging parameters of each of the modes 1 and 2 can include respective logging rates, maximum numbers of writes and types of information logged. Here, the logging parameters can be set or altered by the controller 102 remotely during initialization of the router system 201, can be pre-stored in the storage medium 124 by the vendor or manufacturer of the system 201 and/or can be remotely set or altered by the vendor or manufacturer of the system 201 through the network 110 from the system 101.

At step 402, the controller 122 can perform logging in accordance with mode 1 logging parameters. For example, the controller 122 can log diagnostic information in accordance with mode 1 logging parameters as described above with respect to step 302 of the method 300.

At step 404, the controller 122 can detect an operational problem with the router system 121. For example, the controller 122 can detect an operational problem as described above with respect to step 304.

At step 406, the controller 122 can direct the communication interface 126 to transmit an indication or an identification of the detected operational problem to the technical support system 101 over the network 110.

At step 408, the controller 122 can remotely receive instructions, through the communication interface 126, to switch the logging mode from mode 1 to mode 2. The instructions can be received from the technical support system 101 via the network 110. Here, the technical support system 101 can transmit the instructions to switch the logging mode should it deem the diagnostic information, which can be transmitted to the technical support system 101 by the controller 122, logged in accordance with mode 1 insufficient to solve the operational problem. One advantage of remotely controlling the mode setting through the technical support system 101 is that the vendor or manufacturer, which operates the technical support system 101, can limit the number of instances in which the router system 121 performs logging in accordance with mode 2. As such, the technical support system 101 can prevent the router system 121 from performing an excessive amount of writes, thereby ensuring that the router system can reach a minimum service life. The technical support system can monitor the modes with which the router system 121 logs diagnostic information to periodically estimate the number of writes the router system 121 has made since the router system 121 was initialized. The technical support system 101 can compare the estimate to service life models and can minimize the application of mode 2 logging near the end of the determined service life of the router system 121.

At step 410, the controller 122 can log diagnostic information in accordance with the mode 2 logging parameters. For example, the controller 122 can log diagnostic information in accordance with the mode 2 logging parameters as described above with respect to step 308.

At step 412, the controller 122 can direct the communication interface 126 to transmit the logs generated in accordance with mode 2 at step 410 to the technical support system 101 via the network 110.

At step 414, the controller 122 can receive repair instructions from the technical support system 101 through the communication interface 126 via the network 110. The repair instructions can include indications of or identifications of the repair routines described above with respect to step 310. The repair instructions can also include indications of or specifications of the alterations, described above with respect to step 310, of the logging parameters of mode 1 and/or mode 2 stored in the storage medium 124.

At step 416, the controller 122 can implement the repair instructions received at step 414 in the router system 121. For example, the controller 122 can perform the repair routines described above with respect to step 310. In addition, the controller can perform any alterations of logging parameters indicated or specified in the instructions received at step 414. It should be noted that the method can iterate and loop steps 414 and 416, as multiple communications between the controller 122 and the technical support system 101 can be needed to implement the repair and address the problem identified at step 404. For example, the controller 122 can implement the instructions and can transmit any results of the implementations to the technical support system 101. In addition, the technical support system 101 can generate and transmit new repair instructions to the router system 121 based on the results.

At step 418, the controller 122 can select mode 1 logging parameters in response to completing the repair. For example, similar to step 312 described above, the controller 122 can revert to the logging parameters employed at step 402 or can select any logging parameters of mode 1 altered at step 416. As indicated above, the selection can be implemented by setting a flag for mode 1. In addition, in alternative embodiments, the selection can be prompted by instructions received from the technical support system 101.

At step 420, the controller 122 can perform logging in accordance with mode 1 logging parameters selected at step 418.

Figure 5:
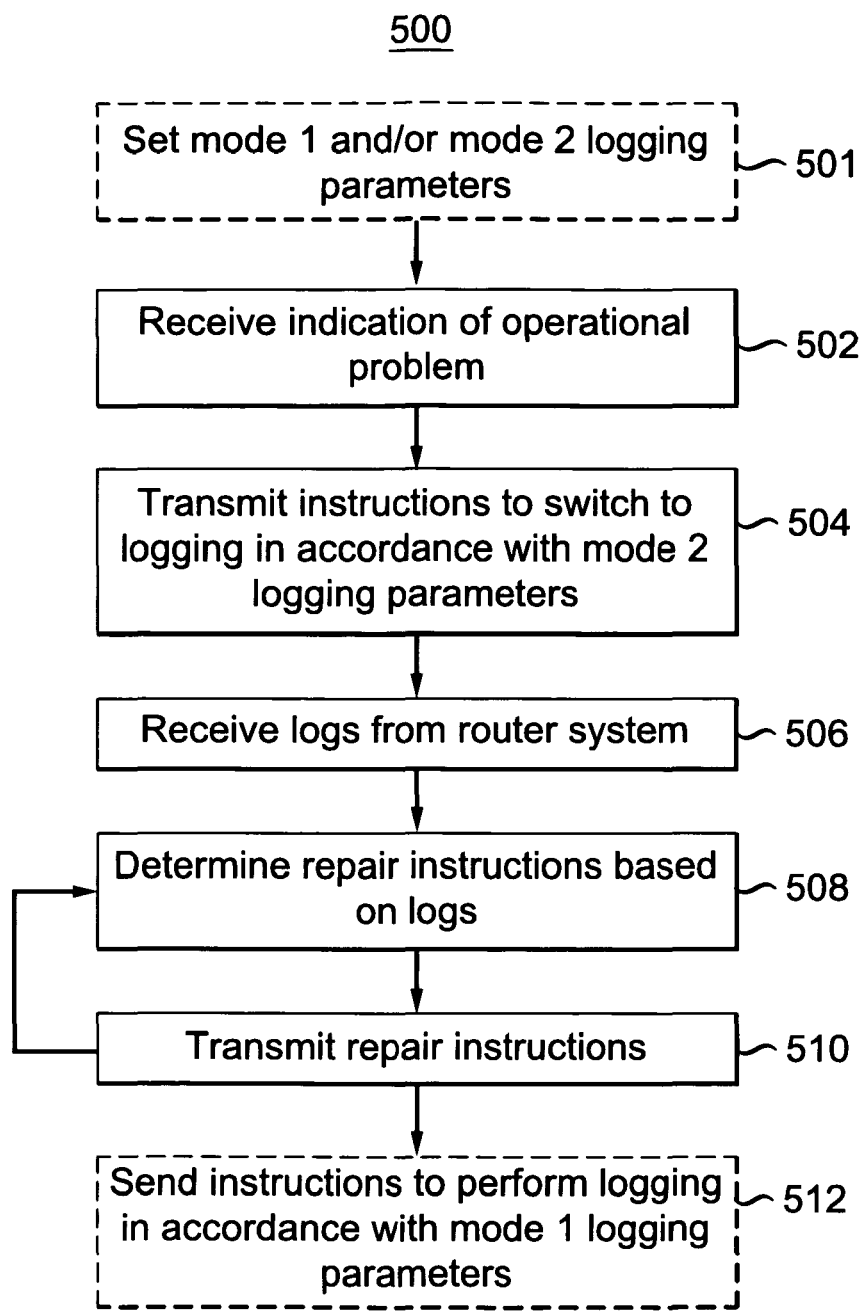
FIG. 5 is a high-level flow diagram of another exemplary embodiment of an alternative logging method in accordance with the present principles.

With reference now to FIG. 5, with continuing reference to FIGS. 1, 3 and 4, an exemplary embodiment of an alternative logging method 500 in accordance with the present principles is illustratively depicted. It should be understood that the method 500 can be performed by the technical support system 101 and, as noted above, can be performed simultaneously with and can complement the method 400.

The method 500 can begin at optional step 501, at the controller 102 can remotely set logging parameters of mode 1 and/or mode 2 of the router system 121 during initialization, as, for example, described above with respect to step 401.

At step 502, the controller 102 can receive an indication of or an identification of an operational problem from the router system 121 through the communication interface 106 via the network 110. For example, the controller 102 can receive the indication of or the identification of the operational problem transmitted at step 406 of the method 400.

At step 504, the controller 102 can direct the communication interface 106 to remotely transmit instructions to switch the logging mode from mode 1 to mode 2 to the router system 121 via the network 110. For example, the controller 102 can direct the transmission of the instructions received by the router system 121 in accordance with step 408 described above. As described above with respect to step 408, the remote control of the mode setting can prevent the router system 121 from performing an excessive amount of writes and can ensure that the router system can reach a minimum service life. Further, the controller 102 of the technical support system 101 can monitor the modes with which the router system 121 logs diagnostic information and can periodically estimate the number of writes the router system 121 has made since the router system 121 was initialized. Moreover, the controller 102 can compare the estimate to service life models stored in the storage medium 104 and can minimize the use of mode 2 logging in the system 121 to extend the service life of the router system 121, as described above with respect to step 408.

At step 506, the controller 102 can receive logs generated in accordance with mode 2 from the router system 121 through the communication interface 106 via the network 110. For example, the controller 102 can receive the logs transmitted by the router system 121 at step 412.

At step 508, the controller 102 can direct the repair module 108 to determine repair instructions to address the operational problem identified or indicated by step 502 based on the diagnostic information logged by the router system 121 in accordance with mode 1 and/or diagnostic information logged by the router system 121 in accordance with mode 2. For example, the repair module 108 can employ standard debugging or troubleshooting tools to determine repair routines, as described above with respect to step 310 of the method 300. In accordance with other exemplary aspects, the controller 102 can add, to the repair instructions, instructions to alter the logging parameters of mode 1 and/or mode 2 stored in the storage medium 124. For example, the alterations can be the same alterations described above with respect to step 310. As indicated above with respect to the customization of logging parameters at step 310, the controller 102 can tailor the logging parameters to obtain information specifically directed to diagnosing and repairing particular operational problems detected in the past. Such problems can include the problem identified or indicated at step 502.

At step 510, the controller 102 can direct the communication interface 106 to remotely transmit the repair instructions to the router system 121. As described above with respect to steps 414 and 416, the method 500 can iterate and loop steps 508 and 510, as multiple communications between the controller 101 and the router system 121 can be needed to implement the repair and address the problem identified at step 502.

At optional step 512, the controller 102 can direct the communication interface 106 to remotely transmit, to the router system 121 via the network 110, instructions to perform logging in accordance with mode 1 in response to the completion of the repair. Alternatively, the router system 121 can be configured to perform step 418 automatically in response to completion of the repair, without direction from the controller 102.

As described above, aspects of the present principles described herein provide several advantages and benefits. In particular, use of different logging modes that are tailored to specific operational characteristics of a computing device can be employed to reduce writing to generate logs and thereby extend the service life of the device. Moreover, the remote setting of the logging modes by a vendor or a manufacturer of the device ensures that the use of enhanced logging modes can be limited and that the device meets minimum service life specifications.

Having described preferred embodiments for systems, methods and apparatuses for logging diagnostic information (which are intended to be illustrative and not limiting), it is noted that modifications and variations can be made by persons skilled in the art in light of the above teachings. It is therefore to be understood that changes can be made in the particular embodiments of the invention disclosed which are within the scope of the invention as outlined by the appended claims. While the forgoing is directed to various embodiments of the present invention, other and further embodiments of the invention can be devised without departing from the basic scope thereof.

The invention claimed is:

1. An apparatus comprising:
a controller circuit configured to:
log first diagnostic information in a memory of the apparatus in accordance with a first mode;
detect an operational problem within the apparatus;
transmit, using a communication interface, an indication of the operational problem to a support system;
receive, using the communication interface, from the support system, instructions to switch logging mode from the first mode to a second mode to log second diagnostic information in accordance with the second mode, depending on a function of a comparison between service life models stored in the support system and an estimate of a number of memory writes performed by the apparatus since the apparatus was initialized, wherein the support system estimates the number of memory writes by monitoring logging modes with which the apparatus logs diagnostic information;
log the second diagnostic information in accordance with the second mode in the memory of the apparatus, in response to receipt of said instructions, the second diagnostic information in accordance with the second mode being logged at a logging rate that is greater than a logging rate of the first mode;
transmit the second diagnostic information to the support system;
receive repair instructions determined based on the second diagnostic information from the support system;
execute repair routines to repair the operational problem within the apparatus in accordance with the received repair instructions; and
switch the logging mode from the second mode to the first mode in response to completing the repair.

2. The apparatus of claim 1, wherein said second diagnostic information is different from said first diagnostic information and wherein said operational problem is at least one of a freeze of said apparatus or a reboot performed in response to said freeze.

3. A support system comprising:
a communication interface configured to:
receive, from an apparatus logging first diagnostic information in a memory of the apparatus in accordance with a first mode, an indication of an operational problem at the apparatus;
to receive from the apparatus a second diagnostic information to transmit instructions to the apparatus to switch a logging mode from the first mode to a second mode;
receive from the apparatus a second diagnostic information; and
transmit repair instructions to the apparatus; and
a controller circuit configured to:
estimate a number of memory writes performed by the apparatus since the apparatus was initialized, by monitoring logging modes with which the apparatus logs diagnostic information;
in response to the received indication of the operational problem at the apparatus, and as a function of a comparison between service life models stored in the support system and the estimate of a number of memory writes performed by the apparatus, direct the communication interface to transmit instructions to the apparatus that direct the apparatus to switch the logging mode from the first mode to the second mode to log the second diagnostic information in accordance with the second mode in the memory of the apparatus, a logging rate of the second mode being greater than a logging rate of the first mode;
determine repair instructions to repair the operational problem within the apparatus in response to received second diagnostic information; and
instruct the communication interface to transmit the repair instructions to the apparatus that direct the apparatus to execute repair routines to repair the operational problem in accordance with the repair instructions and to switch the logging mode from the second mode to the first mode in response to completing the repair.

4. The support system of claim 3, wherein said second diagnostic information is different from said first diagnostic information and wherein said operational problem is at least one of a freeze of said apparatus or a reboot performed in response to said freeze.

5. A method for repairing an apparatus, comprising:
- logging, by a controller circuit of the apparatus, first diagnostic information in a memory of the apparatus in accordance with a first mode;
- detecting, by the controller circuit of the apparatus, an operational problem at the apparatus from the first diagnostic information;
- transmitting, using a communication interface of the apparatus, an indication of the operational problem to a support system;
- receiving, using the communication interface of the apparatus, from the support system, instructions to switch logging mode from the first mode to a second mode to log second diagnostic information in accordance with the second mode, depending on a function of a comparison between service life models stored in the support system and an estimate of a number of memory writes performed by the apparatus since the apparatus was initialized, wherein the support system estimates the number of memory writes by monitoring logging modes with which the apparatus logs diagnostic information;
- logging, by the controller circuit of the apparatus, second diagnostic information in accordance with a second mode in the memory of the apparatus, in response to receiving said instruction, the second diagnostic information in accordance with the second mode being logged at a logging rate that is greater than a logging rate of the first mode;
- transmitting, using the communication interface of the apparatus, the second diagnostic information to the support system;
- receiving, using the communication interface of the apparatus, repair instructions determined based on the second diagnostic information from the support system;
- executing, by the controller circuit of the apparatus, repair routines to repair the operational problem within the apparatus in accordance with the received repair instructions; and
- switch the logging mode from the second mode to the first mode in response to completing the repair.

\* \* \* \* \*